United States Patent
Miyashita et al.

(10) Patent No.: US 8,624,931 B2
(45) Date of Patent: Jan. 7, 2014

(54) INFORMATION PROCESSING APPARATUS, INFORMATION PROCESSING METHOD, AND PROGRAM

(75) Inventors: Ken Miyashita, Tokyo (JP); Kouichi Matsuda, Tokyo (JP)

(73) Assignee: Sony Corporation, Tokyo (JP)

(*) Notice: Subject to any disclaimer, the term of this patent is extended or adjusted under 35 U.S.C. 154(b) by 473 days.

(21) Appl. No.: 12/274,619

(22) Filed: Nov. 20, 2008

(65) Prior Publication Data

US 2009/0147027 A1    Jun. 11, 2009

(30) Foreign Application Priority Data

Dec. 7, 2007    (JP) ................. 2007-317721

(51) Int. Cl.
*G09G 5/00*    (2006.01)
(52) U.S. Cl.
USPC ........................... 345/676; 345/678; 345/681
(58) Field of Classification Search
USPC ................................................. 345/630–677
See application file for complete search history.

(56) References Cited

U.S. PATENT DOCUMENTS

| | | | | |
|---|---|---|---|---|
| 5,801,699 | A * | 9/1998 | Hocker et al. | 715/837 |
| 7,274,379 | B2 * | 9/2007 | Beaumont | 345/630 |
| 7,589,749 | B1 * | 9/2009 | De Laurentis et al. | 345/676 |
| 7,589,750 | B1 * | 9/2009 | Stratton | 345/677 |
| 2004/0143627 | A1 * | 7/2004 | Dietl | 709/203 |
| 2005/0073585 | A1 * | 4/2005 | Ettinger et al. | 348/155 |

FOREIGN PATENT DOCUMENTS

| | | |
|---|---|---|
| JP | 10-207907 | 8/1998 |
| JP | 11-219369 | 8/1999 |
| JP | 2002-21644 | 1/2002 |
| JP | 2003-288352 | 10/2003 |
| JP | 2006-146729 | 6/2006 |
| JP | 2007-310890 | 11/2007 |

OTHER PUBLICATIONS

Office Action issued Nov. 15, 2011, in Japanese Patent Application No. 2007-317721.

* cited by examiner

*Primary Examiner* — Kee M Tung
*Assistant Examiner* — Leon T Cain, II
(74) *Attorney, Agent, or Firm* — Oblon, Spivak, McClelland, Maier & Neustadt, L.L.P.

(57) ABSTRACT

There is provided an information processing apparatus that classifies objects having the respective attribute information which are disposed on a display screen of a graphical user interface, the apparatus including an operation information acquisition unit that acquires operation information containing movement information which indicates a position of a movement destination of the object on the display screen, an instructive request estimate unit that estimates an instructive request for classification processing on the object based on the attribute information and the movement information of the object, a classification processing unit that classifies the object based on the estimated instructive request, and a display control unit that controls display of the object on the display screen. Thus, the user can easily classify the objects without explicitly specifying classification conditions or instructing the performing of the classification processing.

21 Claims, 7 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2007-317721 filed in the Japan Patent Office on Dec. 7, 2007, the entire contents of which being incorporated herein by reference.

BACKGROUND OF THE INVENTION

Field of the Invention

The present invention relates to an information processing apparatus, an information processing method, and a program.

In the case of classifying information which is expressed as an object or the like in a graphical user interface (GUI) by using an information processing apparatus such as a computer, typically, the user specifies classification conditions explicitly and instructs the information processing apparatus to perform classification processing so that this information processing apparatus may perform the classification processing based on the classification conditions specified by the user.

In this case, the user needs to abstract desired classification conditions and explicitly specify the classification conditions so that the information processing apparatus can perform the classification processing. For example, in order to extract an object of photos taken in summer of 2007 from among a plurality of photo objects, the user needs to specify an abstracted condition expression such as "('2007-07'<= $year) && ($year<='2007-09')." Further, the user needs to explicitly instruct the performing of classification processing in accordance with an operation procedure predetermined by the information processing apparatus or an application which is executed in it.

SUMMARY OF THE INVENTION

However, in some cases, the typical user finds it difficult to work out such an abstracted condition expression as given above. Further, in the case of utilizing an information processing apparatus having a lot of functions, the user sometimes finds it difficult also to remember an operation procedure in accordance with which the user would instruct the information processing apparatus to perform classification processing.

It is desirable to provide an information processing apparatus, an information processing method, and a program that can easily classify objects disposed on the display screen of a graphical user interface.

According to a first embodiment of the present invention, there is provided an information processing apparatus that classifies objects having the respective attribute information which are disposed on a display screen of a graphical user interface, the apparatus including an operation information acquisition unit that acquires operation information containing movement information which indicates a position of a movement destination of the object on the display screen, an instructive request estimate unit that estimates an instructive request for classification processing on the object based on the attribute information and the movement information of the object, a classification processing unit that classifies the object based on the estimated instructive request, and a display control unit that controls display of the object on the display screen.

According to this configuration, an instructive request for classification processing on an object is estimated based on the attribute information and movement information of the object, so that the object is classified based on the estimated instructive request. Thus, the user can easily classify the objects without explicitly specifying classification conditions or instructing the performing of the classification processing.

It further includes an object group setting unit that sets an object group which includes a plurality of objects having attribute information common to them and which has classification conditions corresponding to the common attribute information and position information indicating a position on the display screen, in which the classification processing unit causes the object group setting unit to set the object group targeted by the classification processing as a target object group and classifies the unclassified target object having the attribute information that matches the classification conditions of the target object group based on the classification conditions of the target object group. Thus, a plurality of objects having attribute information common to them are set as an object group that has classification conditions which correspond to the attribute information, while an object group targeted by classification processing is set as a target object group. Then, an unclassified target object having the attribute information that matches the classification conditions of the target object group undergoes the classification processing. Accordingly, an unclassified target object is classified based on the classification conditions of a target object group, so that the user can easily classify the objects without explicitly specifying the classification conditions or instructing the performing of the classification processing.

Further, the operation information acquisition unit acquires first movement information about a first object and then acquires second movement information about a second object different from the first object, and if having determined that the first and second objects are disposed close to each other from the first and second movement information and also that the first and second objects have attribute information common to them, the instructive request estimate unit may estimate an instructive request for start of classification processing which uses the common attribute information as the classification conditions. In such a manner, if a first object and a second object have been moved by the user so as to be disposed close to each other and also do they have attribute information common to them, an instructive request is estimated for the classification conditions to be employed in classification processing and the start of the classification processing. Therefore, the user can start classification processing on the objects without explicitly specifying the classification conditions or instructing the performing of the classification processing.

Further, the classification processing unit can cause the object group setting unit to set first and second objects as a target object group, thus starting classification processing based on the classification conditions of the target object group. In such a manner, a plurality of objects moved by the user can be set as a target object group then the classification processing based on the classification conditions of the target object group starts. Therefore, the user can start classification processing on the objects without explicitly setting a target object group or instructing the performing of the classification processing.

Further, the operation information acquisition unit acquires movement information about objects, and if having determined that the objects and an object group have been disposed close to each other from position information of the object group and the movement information of the objects and also the attribute information of the objects matches classification conditions of the object group, the instructive request estimate unit may estimate an instructive request for the start of classification processing. In such a manner, if objects and an object group have been moved by the user so as to be disposed close to each other and also the attribute information of the objects matches the classification conditions of the object group, an instructive request is estimated for the start of the classification processing. Therefore, the user can start classification processing on the objects without explicitly instructing the performing of the classification processing.

Further, the classification processing unit can cause the object group setting unit to set an object group including objects as a target object group, thus starting classification processing based on the classification conditions of the target object group. In such a manner, an object group including object moved by the user is set as a target object group then the classification processing based on the classification conditions of the target object group starts. Therefore, the user can start classification processing on the objects without explicitly setting a target object group or instructing the performing of the classification processing.

Further, the classification processing unit may move a target object toward a target object group at a constant movement speed, while the display control unit may control display so that the target object may move toward the target object group at the constant movement speed. Accordingly, display is provided so that the target object may move toward a target object group at a constant movement speed. Therefore, the user can confirm an instructive request estimated by the information processing apparatus.

Further, if a target object has moved close to a target object group, the classification processing unit may cause the object group setting unit to set the target object group as a target object group that includes the target object. In such a manner, if a target object has moved close to a target object group, the target object group is set as a target object group that includes the target object. Therefore, the user can easily classify objects without explicitly specifying classification conditions or instructing the performing of the classification processing.

Further, the operation information acquisition unit may acquire movement information which indicates the position of a movement destination of a target object on the display screen, while the instructive request estimate unit may estimate an instructive request for classification processing based on the movement information of the target object. In such a manner, an instructive request for classification processing is estimated based on the movement information of a target object. Therefore, the user can easily transmit to the information processing apparatus an instructive request for the classification processing of the object.

Further, if having determined that a target object is prompted to move from the position information of the target object group and the movement information of the target object, the instructive request estimate unit may estimate an instructive request for the continuation of classification processing. In such a manner, if a target object is prompted to move, an instructive request for the continuation of classification processing is estimated. Therefore, the user can easily transmit to the information processing apparatus an instructive request for the continuation of the classification processing.

Further, if an instructive request for the continuation of classification processing is estimated by the instructive request estimate unit, the classification processing unit may increase the movement speed of a target object, while the display control unit may control display so that the target object may move toward the target object group at an increased movement speed. Accordingly, if an instructive request for the continuation of classification processing is estimated, display is provided so that the target object may move at an increased movement speed. Therefore, the user can confirm that an instructive request for the continuation of the classification processing has been transmitted to the information processing apparatus and, further, speed up the progress of the classification processing.

Further, if having determined that a target object is inhibited from moving from the position information of the target object group and the movement information of the target object, the instructive request estimate unit may estimate an instructive request for the stoppage of classification processing. In such a manner, if a target object is inhibited from moving, an instructive request for the stoppage of classification processing is estimated. Therefore, the user can easily transmit to the information processing apparatus an instructive request for the stoppage of the classification processing.

Further, if an instructive request for the stoppage of classification processing is estimated by the instructive request estimate unit, the classification processing unit may stop the movement of a target object, while the display control unit may control display so that the movement of the target object may be stopped. Accordingly, if an instructive request for the stoppage of classification processing is estimated, display is provided so that the target object may stop its movement. Therefore, the user can confirm that an instructive request for the stoppage of the classification processing has been transmitted to the information processing apparatus.

Further, if an instructive request for the stoppage of classification processing is estimated by the instructive request estimate unit, the classification processing unit may cause the object group setting unit to set the target object group as an object group. Accordingly, if an instructive request for the stoppage of classification processing is estimated, the target object group is set as an object group. Therefore, the user can stop the classification processing by the information processing apparatus without explicitly instructing the stoppage of the classification processing.

Further, the operation information acquisition unit may acquire setting cancellation information which indicates an instruction to cancel the setting of a specific object group, while the classification processing unit may cause the object group setting unit to set cancellation of the setting of the specific object group based on the setting cancellation information. In such a manner, the setting of a specific object group is canceled based on setting cancellation information. Therefore, the user can change and modify the results of classification processing by the information processing apparatus.

Further, the display control unit may control display so that the target object group can be distinguished from the other object groups than itself. Accordingly, display is provided so that the target object group may be distinguished from the other target object groups than itself. Therefore, the user can easily confirm the progress status of object classification processing.

Further, the display control unit may control display so that a target object can be distinguished from the other target objects than itself. Accordingly, display is provided so that a target object may be distinguished from the other objects than itself. Therefore, the user can easily confirm a target object which undergoes classification processing.

According to a second embodiment of the present invention, there is provided an information processing method of classifying objects having the respective attribute information which are disposed on a display screen of a graphical user interface, the method including the steps of: acquiring operation information containing movement information which indicates a position of a movement destination of the object on the display screen; estimating an instructive request for classification processing on the object based on the attribute information and the movement information of that object; classifying the object based on the estimated instructive request; and controlling display of the object on the display screen.

According to a third embodiment of the present invention, there is provided a program that causes a computer to perform the information processing method according to the second embodiment of the present invention described above.

According to the embodiments of the present invention described above, there can be provided an information processing apparatus, an information processing method, and a program that can easily classify objects disposed on the display screen of a graphical user interface.

DETAILED DESCRIPTION OF THE PREFERRED EMBODIMENTS

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Functional Components of Information Processing Apparatus)

Figure 1:
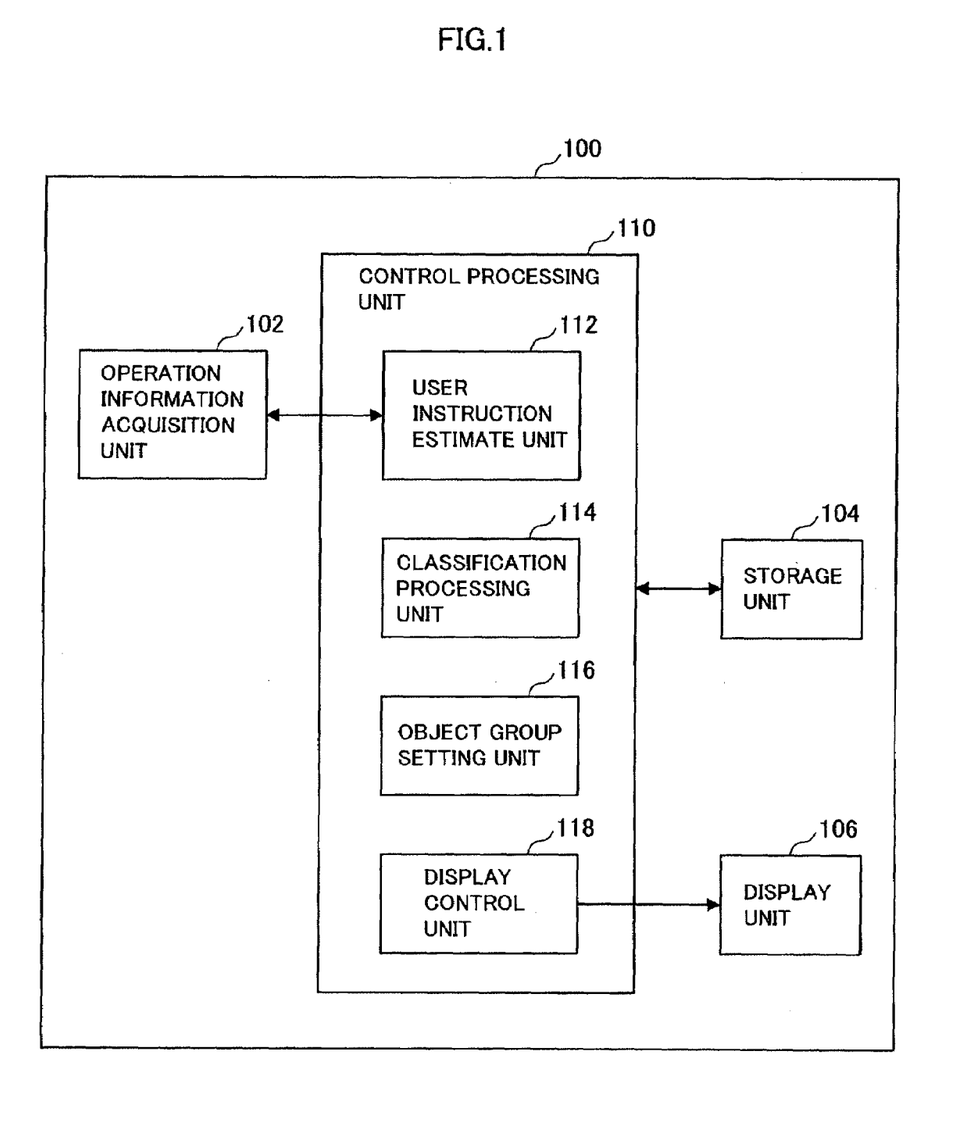
FIG. 1 is a block diagram showing main functional components of an information processing apparatus according to one embodiment of the present invention.

FIG. 1 is a block diagram showing main functional components of an information processing apparatus 100 according to one embodiment of the present invention.

The information processing apparatus 100 may be, for example, a personal computer, a personal digital assistance (PDA), or a cellular phone and has a display screen integrally provided on it or a connection to a display screen provided separately from it. It is to be noted that although the following will describe a case where a display screen is provided integrally on the information processing apparatus 100, the present invention is similarly applicable also to a case where it is provided separately.

As shown in FIG. 1, the information processing apparatus 100 includes an operation information acquisition unit 102, a storage unit 104, a display unit 106, and a control processing unit 110.

The operation information acquisition unit 102 acquires operation information entered by the user through a keyboard, a pointing device, and the like. The operation information contains movement information which indicates the position of a movement destination of an object on the display screen. It is to be noted that although the following will describe a case where operation information is entered through a mouse, the operation information may be entered through any other input device such as a touch panel.

The storage unit 104 is constituted of a storage memory such as a RAM or a ROM and stores information about programs used to make the information processing apparatus 100 operative, and objects. The display unit 106 is constituted of a display, a monitor, or the like which has a display screen and displays a plurality of pieces of information expressed as an object or the like on the display screen.

The control processing unit 110 includes such function units as a user instruction estimate unit (instructive request estimate unit) 112, a classification processing unit 114, an object group setting unit 116, and a display control unit 118 and manages overall control processing on the information processing apparatus 100, including control processing by use of these function units.

The user instruction estimate unit 112 estimates a user's instruction for classification processing on an object based on attribute information and movement information of the object. The classification processing unit 114 classifies the object based on the user's instruction estimated by the user instruction estimate unit 112. The object group setting unit 116 sets an object group which includes a plurality of objects having attribute information common to them and which has classification conditions corresponding to the common attribute information and position information indicating a position of the object group on the display screen. The display control unit 118 controls the display unit 106, which displays objects on the display screen.

Of these function components, the operation information acquisition unit 102, the user instruction estimate unit 112, the classification processing unit 114, the object group setting unit 116, and the display control unit 118 can be realized in the information processing apparatus 100 as hardware and/or software such as a dedicated electronic circuit or a program which is executed by a CPU.

An object may be various kinds of information that can be a target of classification processing by the information processing apparatus 100, such as content data including image, video, and voice, icon in a graphical user interface (GUI), etc. An object has identification information that can identify the object, at least one piece of attribute information, and position information.

The attribute information of an object contains information assigned by the user and information automatically assigned by the information processing apparatus 100 etc. In a case where the object is a photo content, the attribute information contains information of, for example, a date and time when the photo was taken, a place where the photo was taken, a person who took the photo, etc.

The position information of an object is set in order to specify a position and a range where the object is displayed on the display screen. The position information is set as two-dimensional coordinate information in a case where an object is disposed in a two-dimensional coordinate plane and as three-dimensional coordinate information in a case where an object is disposed in a three-dimensional coordinate space.

A plurality of objects classified based on attribute information common to them can make up an object group. An object group has identification information that can identify the object group, classification conditions, position information, group information, and flag information.

The classification conditions for an object group correspond to attribute information common to a plurality of objects that make up an object group. Classification conditions are set as at least one piece of attribute information in order to classify the objects and used as composite conditions if set as a plurality of pieces of attribute information.

Similar to the position information of objects, the position information of an object group is set in order to specify a position and a range where the object group is displayed on the display screen.

The group information of an object group is a set of the identification information of a plurality of objects that make up the object group and set in order to specify the objects classified in the object group.

The flag information of an object group is set in order to specify whether the object group corresponds to the target object group or an ordinary object group. Here, although described in detail later, the target object group means an object group that is handled as a target of classification processing by the information processing apparatus 100.

The information processing apparatus 100 according to the present embodiment is operative to classify objects having the respective attribute information which are disposed on the display screen of a GUI. The following will describe classification processing of the object by the information processing apparatus 100.

(Classification Processing by Information Processing Apparatus)

Figure 2:
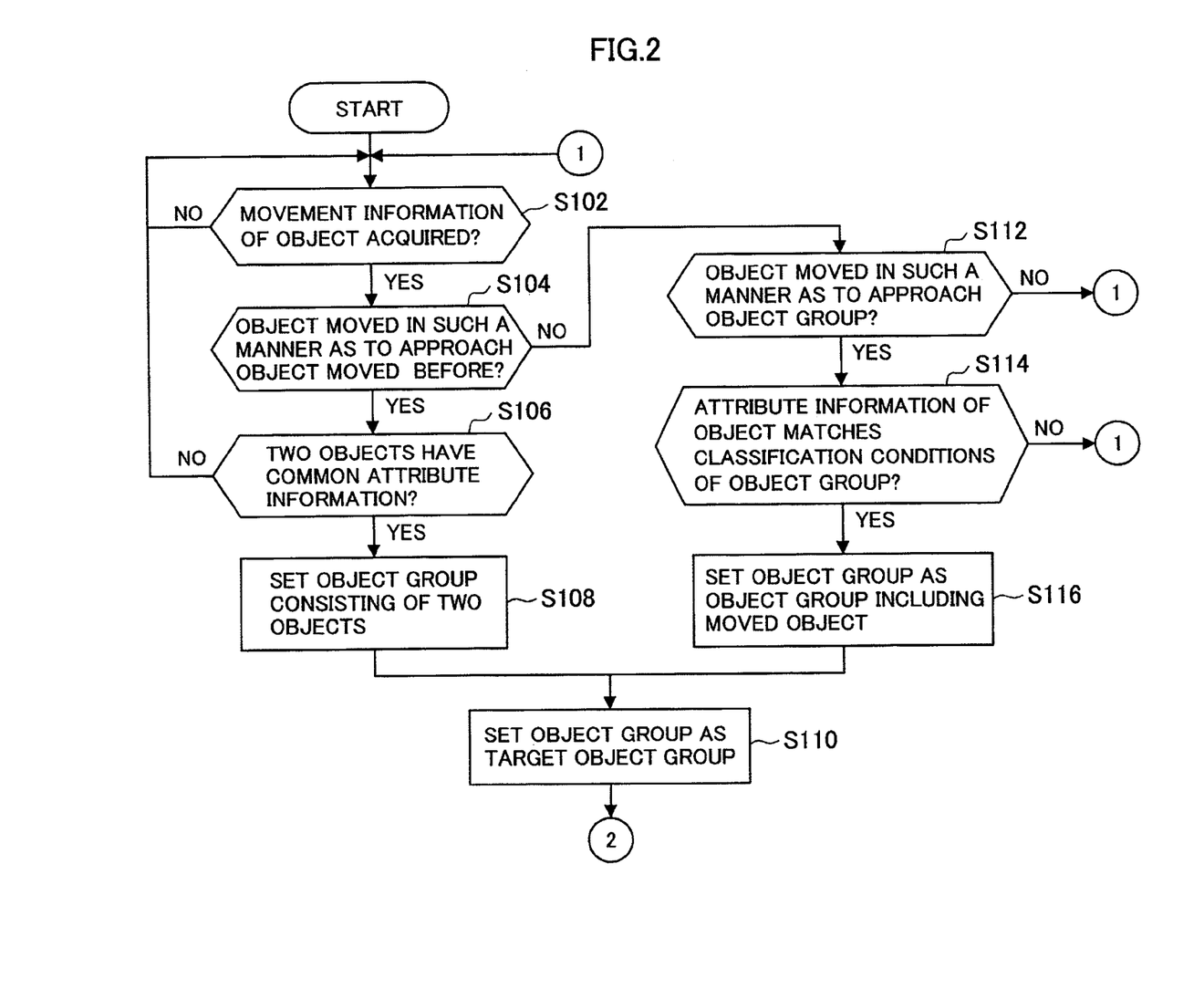
FIG. 2 is a flowchart showing a flow of classification processing by the information processing apparatus.
Figure 3:
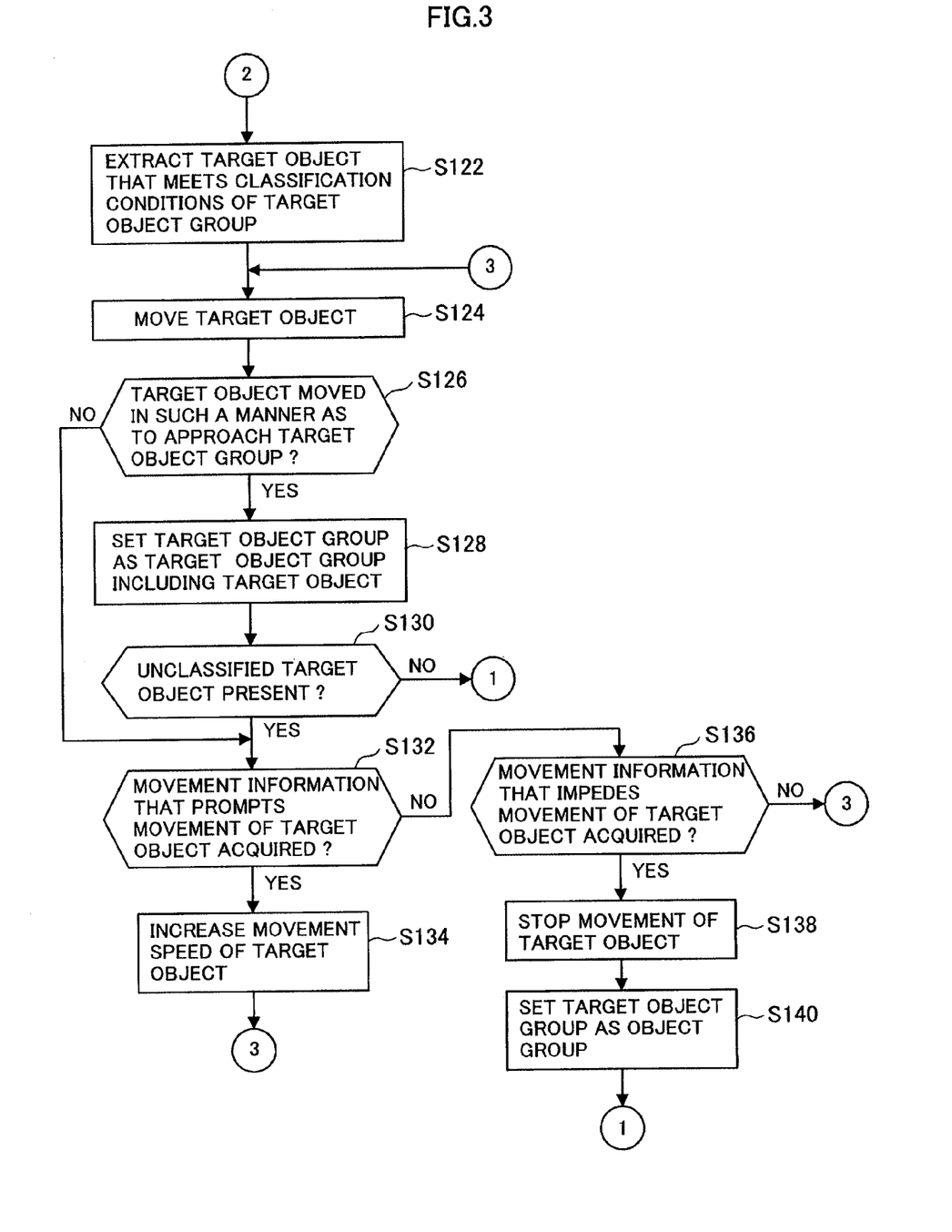
FIG. 3 is a flowchart showing a flow of classification processing by the information processing apparatus.

FIGS. 2 and 3 are a flowchart showing the flow of classification processing by the information processing apparatus 100. FIGS. 4A to 4D, FIGS. 5A to 5D, FIGS. 6A to 6D, and FIGS. 7A to 7D are schematic diagrams explaining the classification processing by the information processing apparatus 100. It is to be noted that in FIGS. 4A to 4D, FIGS. 5A to 5D, FIGS. 6A to 6D, and FIGS. 7A to 7D, an object, an object group, and a target object group are indicated as a square icon, a pile of square icons, and a hatched pile respectively.

Figure 4A:
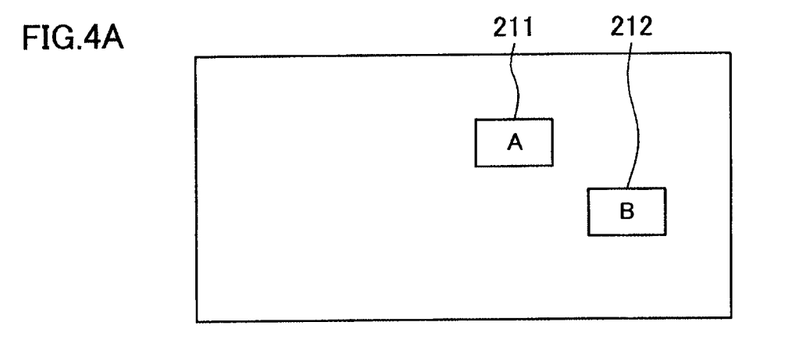
FIG. 4A is a schematic diagram explaining the classification processing by the information processing apparatus.

First, assume a case in which a plurality of objects 211 and 212 are disposed on a display screen of the information processing apparatus 100 in a condition where they are not classified as shown in FIG. 4A.

The user moves a pointer 200 on the display screen through moving operations of a mouse and clicks the mouse in a condition where the pointer 200 is disposed on a specific object, thereby specifying the specific object. If the object is specified, the operation information acquisition unit 102 acquires position information that indicates a position of the pointer 200 on the display screen so that the specified object is specified based on the position information of the pointer 200 and the position information of the object.

The user moves the pointer 200 on the display screen through press-and-drag operations in a condition where the object is specified, thereby moving the object in a condition where its movement is interlocked with that of the pointer 200. If the object is moved, the operation information acquisition unit 102 acquires movement information that indicates a position of the pointer 200 on the display screen so that the movement information of the object may be changed as needed. Then, based on the movement information changed as needed, the display control unit 118 controls display of the object on the display screen.

Figure 4B:
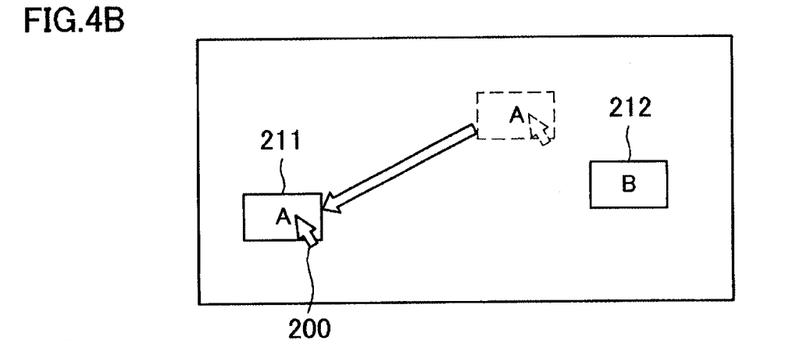
FIG. 4B is a schematic diagram explaining the classification processing by the information processing apparatus.

Next, as shown in FIG. 4B, the user releases the press-and-drag operations in a condition where the object 211 is moved to an arbitrary position on the display screen, thereby completing the movement of the object 211. If the movement of the object 211 is completed, the operation information acquisition unit 102 acquires movement information that indicates a position to which the pointer 200 is moved on the display screen so that the position information of the object 211 may be updated based on this movement information. Then, based on the updated position information, the display control unit 118 controls display of the object 211 on the display screen.

Figure 4C:
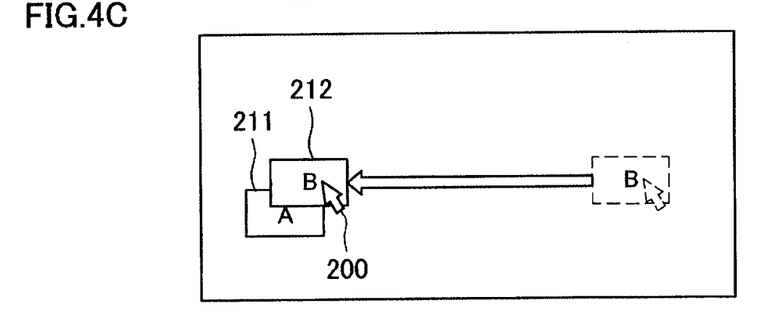
FIG. 4C is a schematic diagram explaining the classification processing by the information processing apparatus.

Here, assume a case where the user has moved the first object 211 and then moved the second object 212 different from the first object 211 so that it is disposed close to the first object 211 on the display screen as shown in FIG. 4C. In this case, as described above, the operation information acquisition unit 102 acquires the first movement information about the first object 211 and the second movement information about the second object 212 (step S102). Then, based on the first and second movement information, the display control unit 118 controls display of the first and second objects 211 and 212.

If the movement information is acquired, the user instruction estimate unit 112 determines whether the first and second objects 211 and 212 are disposed close to each other based on the movement information of the first and second object 211 and 212 (S104).

In this case, if a plurality of objects are overlapped with each other or otherwise disposed within a predetermined distance, the user instruction estimate unit 112 determines that they are disposed close to each other. If having determined that the objects 211 and 212 are disposed close to each other, the user instruction estimate unit 112 determines whether the first and second objects 211 and 212 have common attribute information based on the attribute information of the first and second objects 211 and 212 (S106).

If having determined that the first and second objects 211 and 212 have common attribute information, the user instruction estimate unit 112 estimates that the user has given an instruction to the effect that classification processing using the common attribute information as classification conditions should be started. This enables the user to start object classification processing without explicitly specifying classification conditions or instructing the performing of the classification processing.

On the other hand, if having determined that the first and second objects 211 and 212 have no common attribute information, the user instruction estimate unit 112 estimates that the user has not given an instruction to the effect that the classification processing should be started. In such a case, the information processing apparatus 100 may notify the user of a alarm, for example, to the effect that objects having different attribute information are going to be classified.

It is to be noted that if the condition determination at step S102 or S106 comes up with "NO", the processing by the information processing apparatus 100 returns to step S102, to wait for acquisition of movement information from the user.

If it is estimated that the user has instructed the start of classification processing, the classification processing unit 114 causes the object group setting unit 116 to set an object group 231 made up by the first and second objects 211 and 212 (S108). In this case, the object group setting unit 116 assigns unique identification information to the object group 231. The object group setting unit 116 sets as classification conditions the attribute information common to the first and second objects 211 and 212 and sets as a group information a set of the identification information of the first and second objects 211 and 212.

Further, the object group setting unit 116 sets position information of the object group 231 based on the position information of the first and second objects 211 and 212 and flag information by which the object group 231 is defined as the target object group 241 to be classified (S110).

If the objects are thus set completely by the object group setting unit 116, the classification processing unit 114 starts classification processing based on the classification conditions. Thus, the user can start classification processing on objects without explicitly setting a target object group or instructing the performing of the classification processing.

Figure 4D:
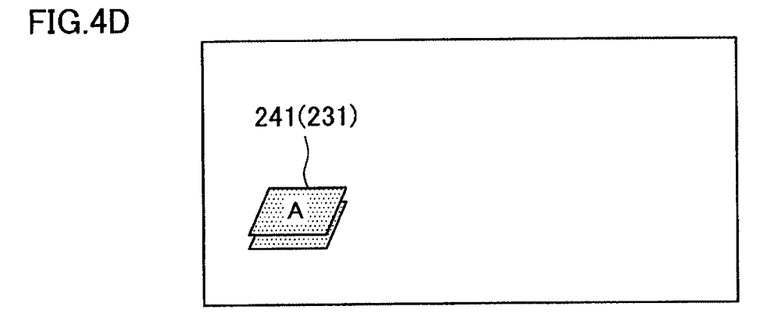
FIG. 4D is a schematic diagram explaining the classification processing by the information processing apparatus.

On the other hand, as shown in FIG. 4D, the display control unit 118 controls display so that the target object group 241 may be distinguished from the other object groups. It is to be noted that the target object group 241 may be displayed as distinguished from the other object groups by utilizing, for example, rotation, uplifting, spotlighting, or blinking. Thus, the user can easily confirm the progress status of the object classification processing.

Figure 5A:
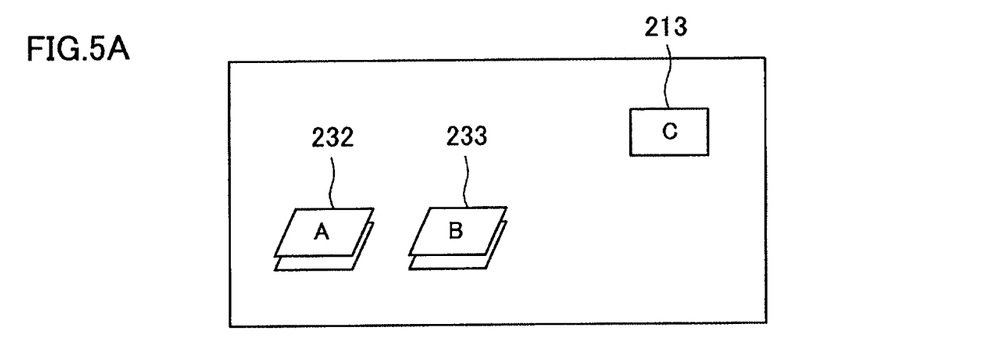
FIG. 5A is a schematic diagram explaining the classification processing by the information processing apparatus.
Figure 5B:
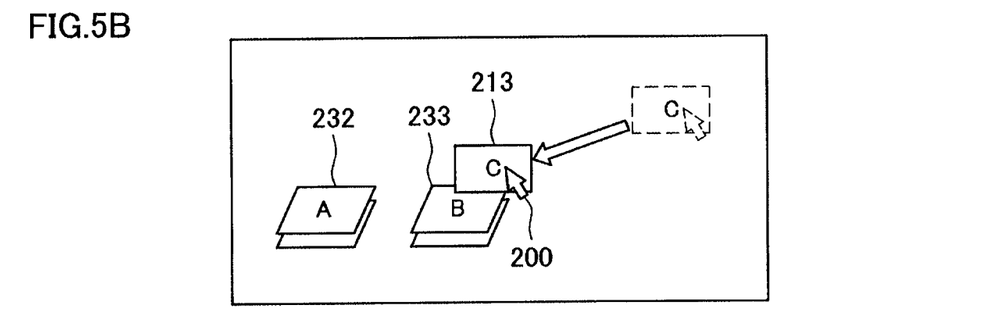
FIG. 5B is a schematic diagram explaining the classification processing by the information processing apparatus.

In the second place, assume a case where there are object groups 232 and 233 on the display screen other than the target object group as shown in FIG. 5A. In this case, if the user has moved the object 213 so that it might be disposed close to the object group 233 as shown in FIG. 5B, the operation information acquisition unit 102 acquires movement information about the object 213 (S102). Then, based on the movement information, the display control unit 118 controls display of the object 213.

If the movement information is acquired, the user instruction estimate unit 112 determines whether the object 213 and the object groups 232 and 233 are disposed close to each other based on the movement information of the object 213 and the position information of the object groups 232 and 233 (S112). In this case, if the object 213 and the object groups 232 and 233 are disposed within a predetermined distance, the user instruction estimate unit 112 determines that the object 213 and the object groups 232 and 233 are disposed close to each other.

If having determined that the object 213 and the object group 233 are disposed close to each other, the user instruction estimate unit 112 determines whether attribute information of the object 213 matches classification conditions of the object group 233 based on the attribute information and the classification conditions (S114). If having determined that the attribute information matches the classification conditions, the user instruction estimate unit 112 estimates that the user has given an instruction to the effect that classification processing should be started. This enables the user to start object classification processing without explicitly instructing the performing of the classification processing.

Figure 5C:
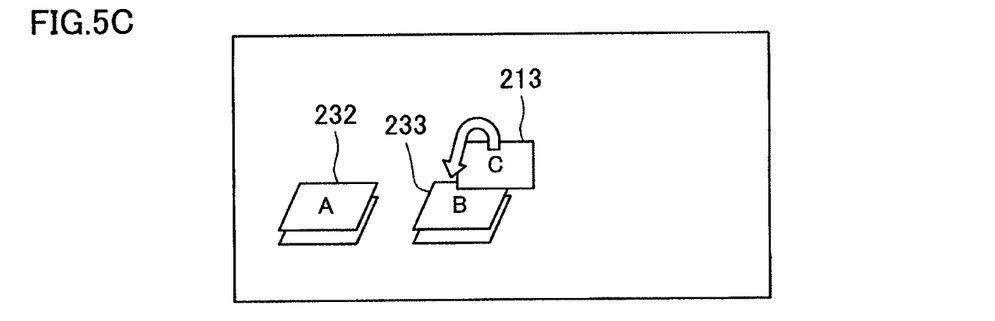
FIG. 5C is a schematic diagram explaining the classification processing by the information processing apparatus.

Then, the display control unit 118 controls display so that the object 213 may be taken into the object group 233 as shown in FIG. 5C. For example, the object 213 may be uplifted over the object group 233 once and then displayed as taken into the object group 233.

On the other hand, if having determined that the attribute information does not match the classification conditions, the user instruction estimate unit 112 estimates that the user has not given an instruction to the effect that the classification processing should be started. In such a case, the information processing apparatus 100 may notify the user of a alarm, for example, to the effect that objects that do not match the classification conditions are going to be classified.

It is to be noted that if the condition determination at step S112 or S114 comes up with "NO", the processing by the information processing apparatus 100 returns to step S102, to wait for acquisition of movement information from the user.

If it is estimated that the user has instructed the start of classification processing, the classification processing unit 114 causes the object group setting unit 116 to set an object group 233 as the object group 233 including the object 213 (S116). In this case, the object group setting unit 116 adds the identification information of the object 213 to the group information, and sets the flag information by which the object group 233 is defined as a target object group 242 (S110).

If the objects are thus set completely by the object group setting unit 116, the classification processing unit 114 starts classification processing based on the classification conditions. Thus, the user can start classification processing on objects without explicitly setting a target object group or instructing the performing of the classification processing.

Figure 5D:
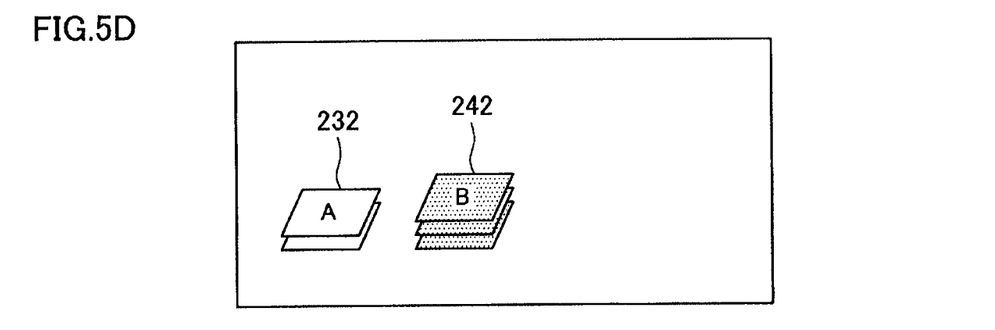
FIG. 5D is a schematic diagram explaining the classification processing by the information processing apparatus.

On the other hand, as shown in FIG. 5D, the display control unit 118 controls display so that the target object group 242 may be distinguished from the other object groups. Thus, the user can easily confirm the progress status of the object classification processing.

Figure 6A:
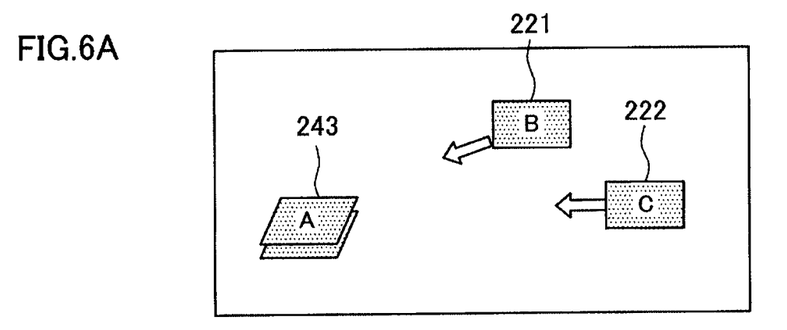
FIG. 6A is a schematic diagram explaining the classification processing by the information processing apparatus.

In the third place, if a target object group 243 is set as shown in FIG. 6A, the classification processing unit 114 starts classification processing based on classification conditions of the target object group 243. First, the classification processing unit 114 extracts objects that have attribute information matching the classification conditions and that are not included in the target object group 243 or any other object groups, as target objects 221 and 222 of classification processing (S122). It is to be noted that if there are not target objects on the display screen, the classification processing unit 114 stops the classification processing on the target object group 243.

On the other hand, the display control unit 118 controls display so that the target objects 221 and 222 may be distinguished from the other objects. The target objects 221 and 222 may be displayed as distinguished from the other objects by utilizing, for example, rotation, uplifting, spotlighting, or blinking. Thus, the user can easily confirm a target object of classification processing.

If the target objects 221 and 222 are extracted, the classification processing unit 114 moves the target objects 221 and 222 toward the target object group 243 at a constant movement speed (S124). The display control unit 118 controls display so that the target objects 221 and 222 move toward the target object group 243 at the constant movement speed. In this case, the movement of the target objects 221 and 222 is expressed by changing the position information of the target objects 221 and 222 so that it nears the position information of the target object group 243 at a constant rate. Therefore, the user can confirm an instruction of the user estimated by the information processing apparatus 100.

If the target objects 221 and 222 start moving, the classification processing unit 114 determines whether the target objects 221 and 222 have moved in such a manner as to be disposed close to the target object group 243, based on the position information of the target objects 221 and 222 and the position information of the target object group 243 (S126). In this case, if the target objects 221 and 222 and the target object group 243 are disposed within a predetermined distance, the classification processing unit 114 determines that both of them are disposed close to each other.

Figure 6B:
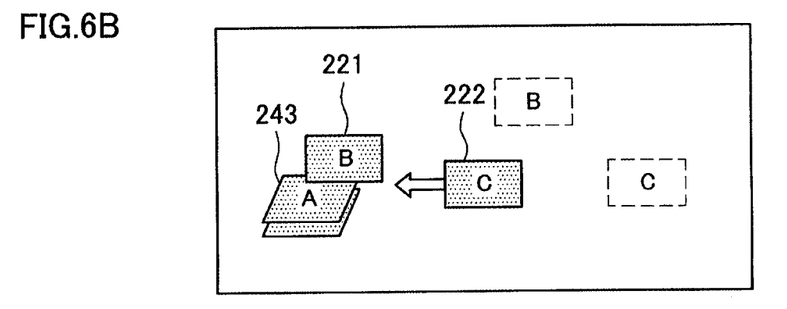
FIG. 6B is a schematic diagram explaining the classification processing by the information processing apparatus.
Figure 6C:
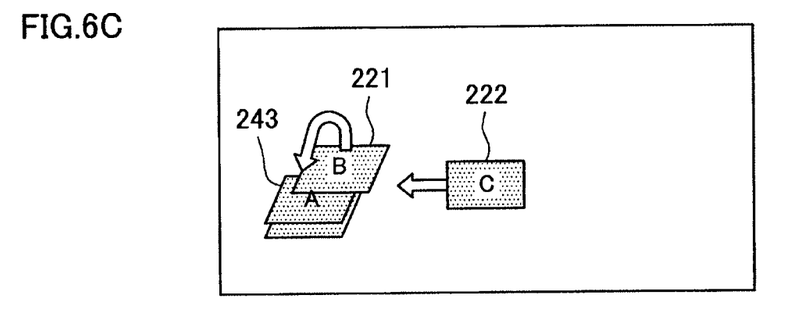
FIG. 6C is a schematic diagram explaining the classification processing by the information processing apparatus.
Figure 6D:
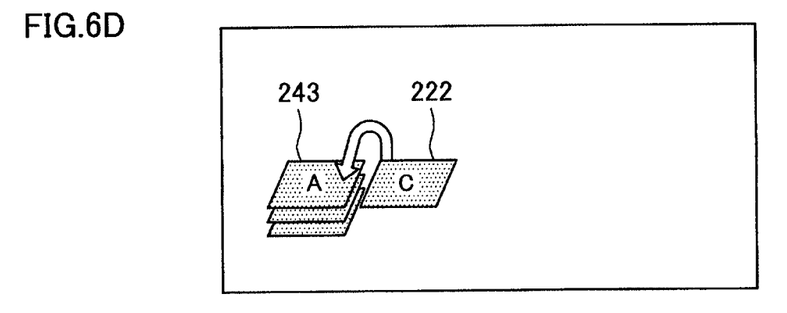
FIG. 6D is a schematic diagram explaining the classification processing by the information processing apparatus.

If having determined that both are disposed close to each other as shown in FIG. 6B, the classification processing unit 114 causes the object group setting unit 116 to set the target object group 243 as the target object group 243 including the target object 221 (S128). In this case, the object group setting unit 116 adds the identification information of the target object 221 to the group information. Thus, the user can easily classify objects without explicitly specifying classification conditions or instructing the performing of classification processing. Then, the display control unit 118 controls display so that the target object 221 may be taken into the target object group 243 as shown in FIG. 6C.

If the target object 221 is set as part of the target object group 243, the classification processing unit 114 determines whether there are any other target objects yet to be classified (S130). If there are no other target objects, the classification processing unit 114 stops the classification processing on the target object group 243, and the processing by the information processing apparatus 100 returns to step S102, to wait for acquisition of movement information from the user. On the other hand, if there are any other target objects, the classification processing unit 114 continues with the following processing.

If the user moves the target objects 221 and 222 in motion on the screen in a condition where the target objects 221 and 222 have started moving, the operation information acquisition unit 102 acquires movement information about the target objects 221 and 222, based on which movement information the display control unit 118 controls display of the target objects 221 and 222. The user instruction estimate unit 112 estimates a user's instruction for classification processing based on the movement information of the target objects 221 and 222 as described below. Thus, the user can easily transmit an instruction for object classification processing to the information processing apparatus 100.

Figure 7A:
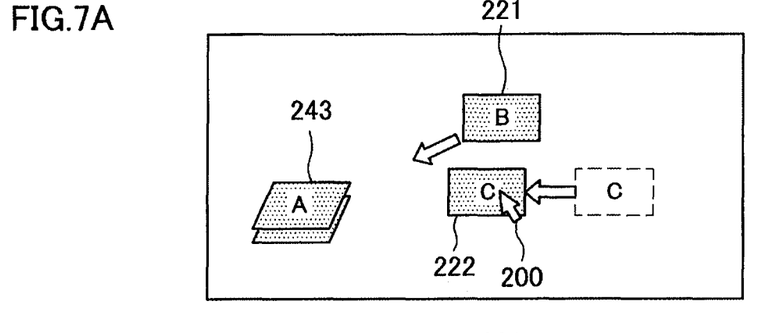
FIG. 7A is a schematic diagram explaining the classification processing by the information processing apparatus.
Figure 7B:
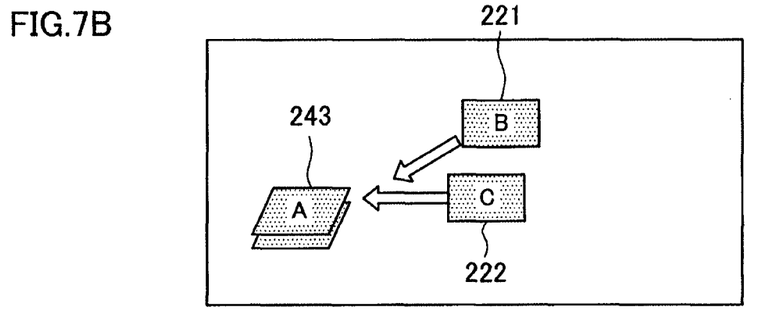
FIG. 7B is a schematic diagram explaining the classification processing by the information processing apparatus.
Figure 7C:
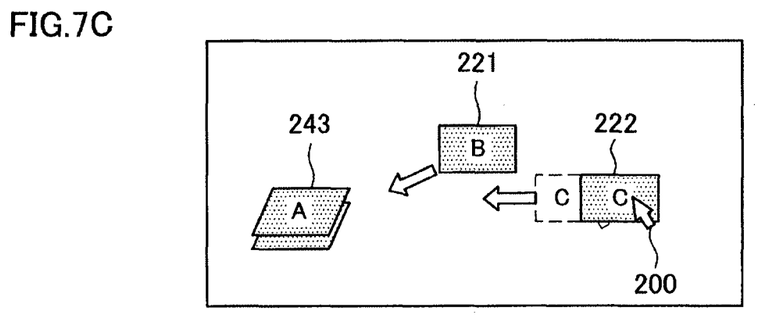
FIG. 7C is a schematic diagram explaining the classification processing by the information processing apparatus.

The user instruction estimate unit 112 determines whether the target objects 221 and 222 are prompted to move or inhibited from moving, based on the movement information of the target objects 221 and 222 (S132, S136). In this case, it determines that the target objects 221 and 222 are prompted to move if the target object 222 is moved toward the target object group 243 as shown in FIG. 7A and, if the target object 222 is moved away from the target object group 243 or stopped in motion as shown in FIG. 7C, determines that the target objects 221 and 222 are inhibited from moving.

It is to be noted that if the condition determination at step S132 and S136 comes up with "NO", the processing by the classification processing unit 114 returns to step S124, to continue with the movement of the target objects 221 and 222.

If having determined that the target object 222 is prompted to move, the user instruction estimate unit 112 estimates that the user has given an instruction to the effect that the classification processing under way should be continued. Thus, the user can easily transmit a continuation instruction for classification processing to the information processing apparatus 100. On the other hand, if having determined that the target object 222 is inhibited from moving, the user instruction estimate unit 112 estimates that the user has given an instruction to the effect that the classification processing under way should be stopped. Thus, the user can easily transmit a stoppage instruction for classification processing to the information processing apparatus 100.

Figure 7D:
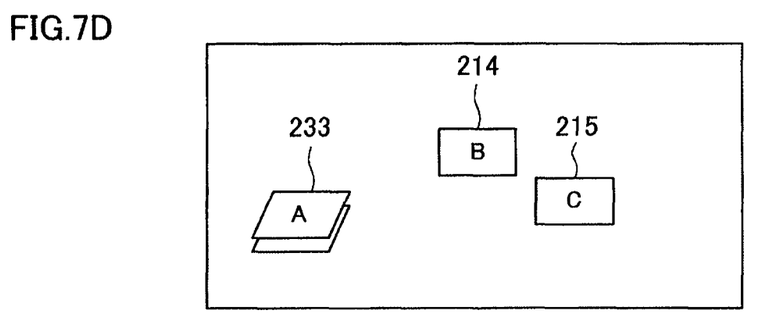
FIG. 7D is a schematic diagram explaining the classification processing by the information processing apparatus.

If the user's instruction is estimated for continuation of the classification processing, the classification processing unit 114 increases the movement speed of the target objects 221 and 222 (S134). Then, the display control unit 118 controls display so that the target objects 221 and 222 may move toward the target object group 243 at an increased movement speed as shown in FIG. 7D. Thus, the user can confirm that an instruction for the continuation of classification processing is transmitted to the information processing apparatus 100 and, further, speed up the progress of the classification processing.

On the other hand, if the user's instruction is estimated for stoppage of the classification processing, the classification processing unit 114 stops the movement of the target objects 221 and 222 (S138). In this case, the object group setting unit 116 sets flag information in which the target object group 243 is defined as an ordinary object group 233 (S140). Thus, the user can stop classification processing by the information processing apparatus 100 without explicitly instructing stoppage of the classification processing. Then, the display control unit 118 controls display so that the target objects 221 and 222 are stopped in motion and displayed as ordinary objects 214 and 215 respectively as shown in FIG. 7D. Thus, the user can confirm that an instruction for the stoppage of classification processing is transmitted to the information processing apparatus 100.

If the user's instruction is estimated for the continuation of classification processing, the processing by the information processing apparatus 100 returns to step S124 to continue with the movement of the target objects 221 and 222. On the other hand, if the user's instruction is estimated for the stoppage of the classification processing, the processing by the information processing apparatus 100 returns to step S102 to wait for acquisition of movement information from the user.

In order to, for example, change or modify the results of classification processing by the information processing apparatus 100, the user can specify a specific object group, for example, through moving operations of the mouse and cancel the setting of the object group through menu operations. In this case, if the operation information acquisition unit 102 has acquired setting cancellation information for the object group, the classification processing unit 114 causes the object group setting unit 116 to establish such setting as to cancel the setting of the object group.

The object group setting unit 116 specifies an object included in an object group based on identification information of the object contained in classification information of the object group and transmits information of the object to the display control unit 118. The display control unit 118 in turn controls display so that the objects displayed as the object group may be displayed as an ordinary object, based on the identification information of the object. Further, the object group setting unit 116 invalidates the identification information, the position information, the group information, and the flag information of the object group. Thus, the user can change and modify the results of classification processing by the information processing apparatus 100 by, for example, reclassifying objects once classified, in accordance with the different classification conditions.

An object group has identification information of its objects classified in accordance with classification conditions, as group information. This enables the user to move an object group on the display screen as in the case of objects, thereby permitting the information processing apparatus 100 to perform various kinds of processing on a plurality of objects as a target. For example, in a case where processing icons are disposed on the display screen for the performing of processing items such as saving, deleting, converting of objects, those items of processing can be performed on a target of a plurality of the objects by moving a group of the objects so that the group is disposed close to the processing icons.

As described above, by the information processing apparatus 100 according to the present embodiment, a user's instruction for classification processing on an object is estimated based on attribute information and movement information of the object, and the object is classified based on the estimated user's instruction. Thus, the user can easily classify the objects without explicitly specifying classification conditions or instructing the performing of the classification processing.

In particular, objects having the common attribute information are set as an object group having classification conditions that correspond to the attribute information, while an object group to be targeted by classification processing is set as a target object group. Then, classification processing will be performed on target objects which are yet to be classified and have the attribute information matching the classification conditions of the target object group. Target objects yet to be classified will be classified based on the classification conditions of a target object group, so that the user can easily classify the objects without explicitly specifying classification conditions or instructing the performing of the classification processing.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus having a central processing unit that classifies objects associated with the respective attribute information and associated with position information representing a position where the objects are disposed on a display screen, the apparatus comprising:
    a display control unit that controls display of the object on the display screen, wherein the display control unit further comprises an object position control unit that acquires a movement instruction provided by a user and performs movement of the object on the display screen based on the movement instruction;
    an operation information acquisition unit that acquires operation information of an object containing movement information, which indicates a movement destination position of the object on the display screen resulting from the movement of the object on the display screen by the object position control unit;
    an instructive request estimate unit implemented by the central processing unit that determines, based on whether a compatibility level between the attribute information of the object and attribute information of a resultant proximate object is greater than a predetermined threshold, whether or not the movement of the object on the display screen by the object position control unit is a classification processing request for the object;
    a classification processing unit that classifies the object based on a result of the determination by the instructive request estimate unit,
    wherein the attribute information of the object is distinct from the operation information and a position of the object on the display screen resulting from movement of the object on the display screen by the object position control unit.

2. The information processing apparatus according to claim 1, wherein the instructive request estimate unit further compares the attribute information of the object with classification conditions of a target object group and, in response to obtaining a positive result from the comparison with regard to compatibility, concludes that the movement of the object is a classification processing request for the object, the target object group including a plurality of objects having a common attribute information and having the classification conditions corresponding to the common attribute information and position information indicating a position on the display screen.

3. The information processing apparatus according to claim 2, wherein
    the operation information acquisition unit acquires the movement information about a plurality of objects, and
    in response to having determined that the objects and a first object group are disposed close to each other from the position information of the first object group and the movement information of the objects and having determined that the attribute information of the objects matches the classification conditions of the first object group, the instructive request estimate unit determines that the movement of the objects is a classification processing request for adding the objects to the first object group.

4. The information processing apparatus according to claim 3, wherein the classification processing unit sets the first object group including the objects as the target object group, thus starting classification processing based on the classification conditions of the first object group.

5. The information processing apparatus according to claim 2, wherein
    the classification processing unit initiates movement of a target object toward the target object group at a constant movement speed, and
    the display control unit controls display so that the target object moves toward the target object group at the constant movement speed.

6. The information processing apparatus according to claim 5, wherein in response to the target object being permitted to move close to the target object group, the classification processing unit includes the target object in the target object group.

7. The information processing apparatus according to claim 5, wherein
the operation information acquisition unit acquires movement information of the target object, which indicates a movement destination position of the target object on the display screen resulting from movement of the target object, and
the instructive request estimate unit determines, based on the movement information of the target object, whether or not the movement of the target object is a classification processing request for the target object.

8. The information processing apparatus according to claim 7, wherein in response to having determined that the target object is prompted to move from the position information of the target object group and from the movement information of the target object, the instructive request estimate unit determines whether or not the movement of the target object resulting from the prompt is a request for continuation of the classification processing.

9. The information processing apparatus according to claim 8, wherein
in response to a determination by the instructive request estimate unit that the movement of the target object is the request for the continuation of the classification processing, the classification processing unit initiates an increase in the movement speed of the target object, and
the display control unit controls display so that the target object moves toward the target object group at the increased movement speed.

10. The information processing apparatus according to claim 7, wherein in response to having determined that the target object is inhibited from moving from the position information of the target object group and the movement information of the target object, the instructive request estimate unit determines that the movement of the target object is not a request for the classification processing.

11. The information processing apparatus according to claim 10, wherein
in response to the instructive request estimating unit determining that the movement is not the request for the classification processing, the classification processing unit initiates cessation of movement of the target object, and
the display control unit controls display so that the target object is stopped in motion.

12. The information processing apparatus according to claim 10, wherein in response to the instructive request estimating unit determining that the movement is not the request for the classification processing, the classification processing unit sets the target object group as a non-targeted object group.

13. The information processing apparatus according to claim 5, wherein the display control unit controls display so that the target object is displayed in way such that the target object is distinguishable from objects other than the target object.

14. The information processing apparatus according to claim 2, wherein
the operation information acquisition unit acquires setting cancellation information which indicates an instruction to cancel targeting of a specific object group, and
the classification processing unit cancels targeting of the specific object group based on the setting cancellation information.

15. The information processing apparatus according to claim 2, wherein the display control unit controls display so that the target object group is displayed in way such that the target object group is distinguishable from object groups other than the target object group.

16. The information processing apparatus according to claim 1, wherein
the operation information acquisition unit acquires the movement information about the movement of the object and then acquires second movement information about a movement of a second object different from the object, and
in response to having determined that the object and second object are disposed close to each other from the movement information and the second movement information and having determined that the object and the second object have common attribute information, the instructive request estimate unit determines that the movement of the object and the movement of the second object is a classification processing request for classifying the object and the second object into a common new object group.

17. The information processing apparatus according to claim 16, wherein the classification processing unit groups the object and the second object the new object group, thus starting the new object group based on classification conditions of the common attribute information of the object and the second object.

18. An information processing method, implemented by a information processing apparatus having a central processing unit, of classifying objects associated with the respective attribute information and associated with position information representing a position where the objects are disposed on a display screen, the method comprising the steps of:
controlling display of the object on the display screen, the controlling further comprising
acquiring a movement instruction provided by a user, and
performing movement of the object on the display screen based on the movement instruction;
acquiring operation information containing movement information of an object, which indicates a movement destination position of the object on the display screen resulting from the movement of the object on the display screen by the performing;
determining, based on whether a compatibility level between the attribute information of the object and attribute information of a resultant proximate object is greater than a predetermined threshold using the central processing unit, whether or not the movement of the object on the display screen by the performing is a classification processing request for the object, the attribute information of the object being distinct from the operation information and a position of the object on the display screen resulting from movement of the object on the display screen by the performing; and
classifying the object based on a result of the determination by the determining.

19. A non-transitory computer readable medium having stored thereon a program that when executed by a computer causes the computer to perform an information processing method of classifying objects associated with the respective attribute information and associated with position information representing a position where the objects are disposed on a display screen, the information processing method comprising the steps of:
controlling display of the object on the display screen, the controlling further comprising
acquiring a movement instruction provided by a user, and performing movement of the object on the display screen based on the movement instruction;

acquiring operation information containing movement information of an object, which indicates a movement destination position of the object on the display screen resulting from movement of the object on the display screen by the performing;

determining, based on whether a compatibility level between the attribute information of the object and attribute information of a resultant proximate object is greater than a predetermined threshold, whether or not the movement of the object on the display screen by the performing is a classification processing request for the object, the attribute information of the object being distinct from the operation information and a position of the object on the display screen resulting from movement of the object on the display screen by the performing;

classifying the object based on a result of the determination by the determining; and controlling display of the object on the display screen.

20. The information processing apparatus according to claim 1, wherein the attribute information of the object is distinct from the position of the object on the display screen resulting from movement of the object.

21. The information processing apparatus according to claim 1, wherein the attribute information is distinct from an appearance of the object on the display screen.

* * * * *